(12) United States Patent
Kong

(10) Patent No.: US 12,278,400 B2
(45) Date of Patent: Apr. 15, 2025

(54) ELECTRODE POST AND BATTERY COVER

(71) Applicant: SUZHOU MAYER NEW ENERGY CO., LTD, Suzhou (CN)

(72) Inventor: Donggen Kong, Suzhou (CN)

(73) Assignee: SUZHOU MAYER NEW ENERGY CO., LTD, Suzhou (CN)

( * ) Notice: Subject to any disclaimer, the term of this patent is extended or adjusted under 35 U.S.C. 154(b) by 0 days.

(21) Appl. No.: 18/661,730

(22) Filed: May 13, 2024

(65) Prior Publication Data
US 2024/0297423 A1    Sep. 5, 2024

Related U.S. Application Data

(63) Continuation of application No. PCT/CN2023/080297, filed on Mar. 8, 2023.

(30) Foreign Application Priority Data

Mar. 11, 2022 (CN) .......................... 202220522900.2
Mar. 11, 2022 (CN) .......................... 202220522902.1
(Continued)

(51) Int. Cl.
  *H01M 10/00* (2006.01)
  *H01M 50/148* (2021.01)
  (Continued)

(52) U.S. Cl.
  CPC ....... *H01M 50/567* (2021.01); *H01M 50/148* (2021.01); *H01M 50/188* (2021.01); *H01M 50/193* (2021.01); *H01M 50/543* (2021.01)

(58) Field of Classification Search
  CPC ............. H01M 50/567; H01M 50/148; H01M 50/188; H01M 50/193; H01M 50/543; Y02E 60/10
  See application file for complete search history.

(56) References Cited

U.S. PATENT DOCUMENTS

2022/0085464 A1*  3/2022  Wakimoto .......... H01M 50/557

FOREIGN PATENT DOCUMENTS

| CN | 110212124 A | 9/2019 |
| CN | 112751114 A | 5/2021 |

(Continued)

OTHER PUBLICATIONS

Machine translation of CN 110212124 A (Year: 2019).*
(Continued)

*Primary Examiner* — Nicholas P D'Aniello
(74) *Attorney, Agent, or Firm* — Andrew C. Cheng

(57) ABSTRACT

An electrode post for a battery cover, includes an upper substate and a lower substrate. An upper connection surface for contacting with an external component is arranged on one side of the upper substrate, an extension board is arranged on the other side of the upper substrate, a groove for receiving a sealing element and a fastener is formed in a side wall of the extension board; and the lower substrate is arranged at a tail end of the extension board, a lower connection surface for contacting with an inner component of a battery is arranged on a side, opposite to the extension board, of the lower substrate. The connection strength of the electrode post and the battery cover is increased and the structural strength and sealing performance of a final battery product is increased, thus improving the reliability and prolonging the service life of the final battery product.

10 Claims, 11 Drawing Sheets

(30) Foreign Application Priority Data

Mar. 11, 2022 (CN) .......................... 202220522903.6
Apr. 11, 2022 (CN) .......................... 202220824705.5

(51) Int. Cl.
*H01M 50/188* (2021.01)
*H01M 50/193* (2021.01)
*H01M 50/543* (2021.01)
*H01M 50/567* (2021.01)

(56) References Cited

FOREIGN PATENT DOCUMENTS

| CN | 213401339 U | 6/2021 |
|---|---|---|
| CN | 216928738 U | 7/2022 |
| CN | 216928739 U | 7/2022 |
| CN | 216928741 U | 7/2022 |
| CN | 217114593 U | 8/2022 |

OTHER PUBLICATIONS

Machine translation of CN 112751114 A (Year: 2021).*
International Search Report of PCT Patent Application No. PCT/CN2023/080297 issued on Jun. 23, 2023.

* cited by examiner

ELECTRODE POST AND BATTERY COVER

CROSS-REFERENCE TO RELATED APPLICATIONS

This application is a continuation of International (PCT) Patent Application No. PCT/CN2023/080297, filed on Mar. 8, 2023, which claims priority to Chinese Patent Application No. 202220522902.1, filed on Mar. 11, 2022, Chinese Patent Application No. 202220522903.6, filed on Mar. 11, 2022, Chinese Patent Application No. 202220522900.2, filed on Mar. 11, 2022, and Chinese Patent Application No. 202220824705.5, filed on Apr. 11, 2022, which are incorporated herein by reference in its entirety.

FIELD

The invention relates to the field of electrode posts, in particular to an electrode post and a battery cover.

BACKGROUND

At present, batteries have been widely applied to the electronic field, the automative field, the aviation field, the medical field and many other fields, and the performance of the batteries has become the key factor affecting the development of all industries. Liquid battery covers which are used mostly widely at present have three important performance indicators: the sealing performance of electrode posts, the connection strength of the electrode posts, and the internal resistance of the electrode posts. Existing batteries often adopt sealing rings to realize sealing, and the electrode posts are connected to battery bodies by fixed riveting, welding, or injection molding. However, the internal resistance of the electrode posts will be increased after fixed riveting and welding, the temperature of the electrode posts will rise with the increase of the internal resistance, and the temperature of the batteries will be increased accordingly. The traditional method for connecting electrode posts to a cover by injection molding has an unsatisfying connection effect due to small connection surfaces between the electrode posts and plastic, the assembly process is relatively complex, and the quality reliability is low; in addition, after long-term use, sealing problems easy occur to lead to electrolyte leaking, thus causing potential safety hazards.

SUMMARY

To solve at least one technical problem mentioned in the background, the embodiments of the invention provide an electrode post for a battery cover to improve the connection strength of the electrode post and the battery cover and the structural strength, sealing performance and large-current tolerance of a final battery product, thus improving the reliability of the final battery product and prolonging the service life of the final battery product.

In order to solve at least one technical problem mentioned above, an electrode post for a battery cover according to an embodiment of the present invention is provided. The electrode post comprises an upper substrate, an upper connection surface for contacting with an outside component to realize electrical connection being arranged on one side of the upper substrate; an extension board arranged on the other side of the upper substrate, a groove for receiving a fastener being formed in a side wall of the extension board; and a lower substrate arranged at a tail end of the extension board, a lower connection surface for contacting with an inside component of a battery to realize electrical connection being arranged on a side, opposite to the extension board, of the lower substrate. Nano-pores are formed at least in side walls of the upper substrate, the extension board and the lower substrate.

In one embodiment, the groove comprises two or more discontinuous sections which are uniformly formed in the side wall of the extension board; or the groove is continuously formed in the side wall of the entire extension board.

In one embodiment, the groove is used for receiving a sealing element.

In one embodiment, the sealing element is a rubber ring.

In one embodiment, the fastener is provided with a plastic cover formed by nano molding technology.

In one embodiment, a first transition surface is arranged on a sharp portion of the groove, and the first transition surface is a slope or a round surface.

In one embodiment, the upper substrate, the upper connection surface, the extension board, the lower substrate and the lower connection surface are formed by aluminum through integrated stamping or machining.

In one embodiment, wherein the upper substrate, the upper connection surface and the extension board are made from aluminum, the lower substrate and the lower connection surface are made from copper, and the upper substrate, the upper connection surface, the extension board, the lower substrate and the lower connection surface are formed through integrated stamping or machining.

A battery cover with good sealing performance according to an embodiment of the present invention, comprises a top cover plate, an electrode post and a sealing element formed by nano molding technology, wherein a substrate which is concaved inwards is arranged on the top cover plate, a third through-hole with an undercut is formed in the substrate, the sealing element comprises an upper sealing layer, a side sealing layer, a lower sealing layer and an dovetail-shaped column which are connected in sequence, the upper sealing layer, the side sealing layer and the lower sealing layer wrap around an upper surface, a side surface and one part of a lower surface of the substrate respectively, the dovetail-shaped column extends from the upper sealing layer to fill in the third through-hole, an edge of the dovetail-shaped column extends out of the third through-hole and is connected to the lower sealing layer to form a third transition surface, the third transition surface contracts gradually towards the electrode post, the electrode post is disposed in the side sealing layer, and a first flange is arranged around the electrode post and extends into the sealing element.

In one embodiment, an inner diameter of the third through-hole increases gradually at a bottom of the substrate to form an inverted first flared opening, the dovetail-shaped column comprises an extension column and a divergent column, the extension column extends from the upper sealing layer into the third through-hole, the divergent column diverges in the first flared opening, and the extension column and the divergent column fill in the third through-hole and the first flared opening respectively.

In one embodiment, a bottom surface of the divergent column does not exceed a bottom surface of the substrate where the first flared opening is located.

In one embodiment, the sealing element is integrally formed by PPS plastic, LCP plastic, PEEK plastic, PBT plastic or PI plastic through nano injection molding.

In one embodiment, the top cover plate is provided with a connecting region and a mounting hole, the mounting hole is located in a centre of the connecting region and passes through the top cover plate, at least one through-hole is formed in the connecting region, the through-holes are uniformly distributed in the connecting region and pass through the connecting region, and nano-pores are formed at least in the connecting region of the top cover plate.

In one embodiment, the through-holes comprise first through-holes and second through-holes, inner diameters of the second through-holes are less than inner dimeters of the first through-holes, the first through-holes are uniformly distributed in the connecting region, and each of the second through-holes is located between two adjacent the first through-holes.

In one embodiment, the connecting region and the mounting hole are both square, a central axis of the connecting region is coaxial with a central axis of the mounting hole, a diagonal of the connecting region overlaps with a diagonal of the mounting hole, corners of the connecting region and the mounting hole are round corners, and the connecting region uniformly encircles of the mounting hole.

In one embodiment, a second flared opening is formed in the end of each of the through-holes in the connecting region, and the inner diameter of the second flared opening decreases gradually from outside to inside until it reaches the inner diameter of the through-hole.

In one embodiment, the connecting region is concaved in the top cover plate.

In one embodiment, in a case where the top cover plate covers one electrode of a battery, the top cover plate is provided with one said connecting region and one said mounting hole; in a case where the top cover plate covers two electrode of the battery, the top cover plate is provided with two said connecting regions and two said mounting holes, and the two connecting regions and the two said mounting holes are located at two ends of the top cover plate respectively and correspond to a positive electrode and a negative electrode of the battery respectively.

A battery cover with good sealing performance according to an embodiment of the present invention, comprises a top cover plate, an electrode post and a connecting member, wherein an attached part is arranged on the top cover plate, a middle portion of the attached part is hollowed out, a reinforcing hole is formed in the attached part, the attached part is wrapped with a connecting member, the connecting member comprises an upper connecting layer, a reinforcing rod and a lower connecting layer, the upper connecting layer and the lower connecting layer are located on front and back sides of the attached part respectively, the reinforcing rod penetrates through the reinforcing hole and connects the upper connecting layer and the lower connecting layer, a second flange is arranged on an inner wall of the connecting member, the electrode post is located in the hollowed-out portion of the attached part, a groove is formed in a side wall of the electrode post, the connecting member wraps around the side wall of the electrode post, and the second flange is located in the groove.

In one embodiment, the electrode post protrudes out of the top cover plate, and a fourth transition surface is arranged on the connecting member and the fourth transition surface is a slope extending from the upper connecting layer to a top of the side wall of the electrode post.

In one embodiment, a receiving portion is formed in a surface of the attached part, the receiving portion is lower than an upper surface of the top cover plate, the upper connecting layer is received in the receiving portion, and an upper surface of the upper connecting layer is not higher than the upper surface of the top cover plate.

In one embodiment, the connecting member, the upper connecting layer, the reinforcing rod, the lower connecting layer, the fourth transition surface and the second flange are integrally formed by PPS plastic through nano injection molding.

In one embodiment, a plurality of said reinforcing holes are uniformly distributed in the attached part, and the reinforcing holes are shaped like an inverted funnel.

In one embodiment, the groove is continuously formed around the electrode post; or the groove comprises multiple discontinuous sections which are uniformly distributed around the electrode post.

In one embodiment, nano-pores are formed in a surface of the side wall of the electrode post, a surface of the groove and a surface of at least the attached part of the top cover plate.

Compared with the prior art, the embodiments of the invention have the following beneficial effects:

When the electrode post in embodiments of the invention is mounted on a battery cover, a sealing element received in the groove can be clamped in the battery cover by means of a fastener, and the connection strength of the electrode post and a plastic material during nano injection molding is effectively increased, thus increasing the structural strength of the final battery cover, effectively solving the problems of frequent falling and sealing failures of the electrode post of final battery products, improving the reliability of the final battery products and prolonging the service life of the final battery products.

Wherein, 10, upper substrate; 11, upper connection surface; 12, first sign; 13, extension board; 14, lower substrate; 15, lower connection surface; 16, groove; 17, first transition surface; 18, top cover plate; 19, substrate; 20, third through-hole; 21, first flared opening; 22, electrode post; 23, first flange; 24, sealing element; 25, upper sealing layer; 26, side sealing layer; 27, lower sealing layer; 28, second transition surface; 29, third transition surface; 30, dovetail-shaped column; 31, extension column; 32, divergent column; 33, explosion-proof piece; 34, explosion-proof groove; 36, chamber; 37, connecting region; 38, first through-hole; 39, second through-hole; 40, second flared opening; 41, mounting hole; 42, fool-proof opening; 44, positive electrode post; 45, negative electrode post; 47, second sign; 48, attached part; 49, receiving portion; 50, reinforcing hole; 51, connecting member; 52, upper connecting layer; 53, reinforcing rod; 54, lower connecting layer; 55, fourth transition surface; 56, second flange; 57, slope.

DESCRIPTION OF THE EMBODIMENTS

The technical solutions of the embodiments of the invention will be clearly and completely described below in conjunction with the accompanying drawings of the embodiments of the invention. Obviously, the embodiments described below are merely illustrative ones, and are not all possible ones of the invention. All other embodiments obtained by those ordinarily skilled in the art based on the following ones without creative labor should fall within the protection scope of the invention.

First Embodiment

Figure 1:
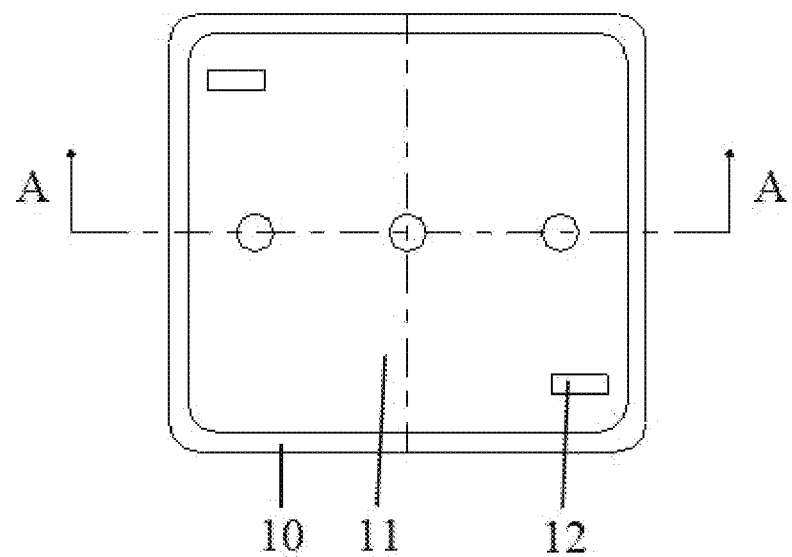
FIG. 1 is a schematic top view of an electrode post for a battery cover according to one of the embodiments of the invention.
Figure 2:
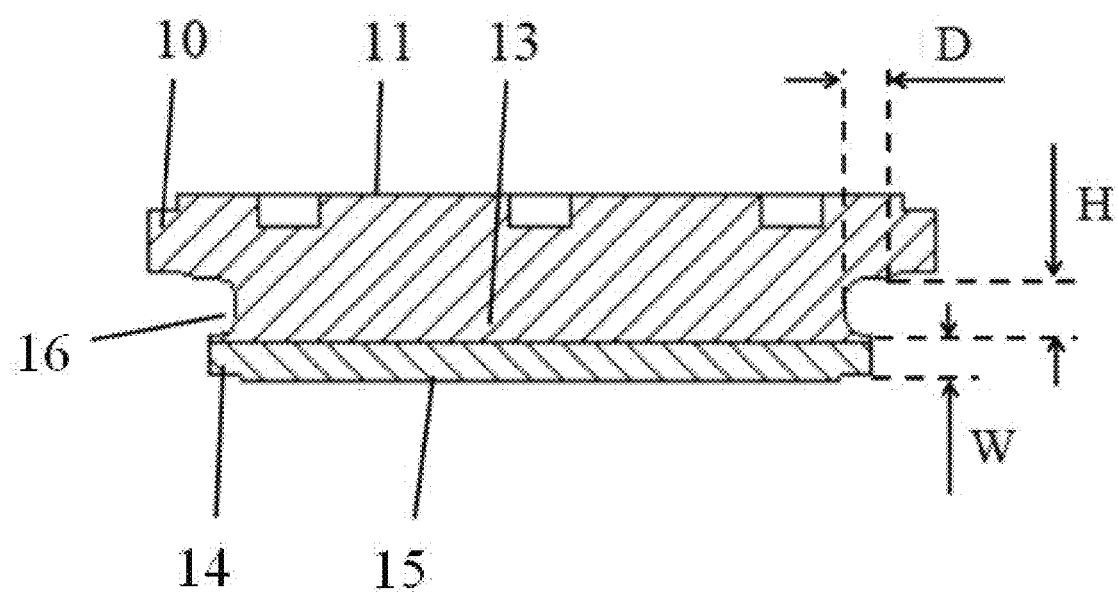
FIG. 2 is a schematic cross-sectional view along line A-A of the electrode post for a battery cover according to one of the embodiments of the invention.
Figure 3:
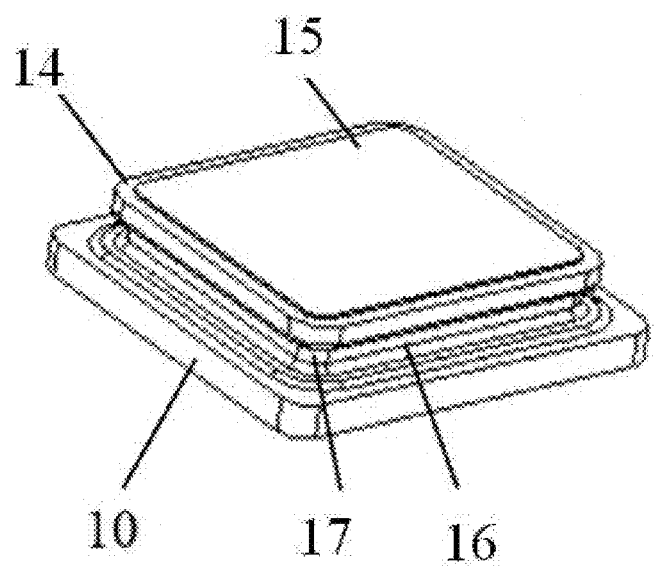
FIG. 3 is a schematic structural view of the electrode post for a battery cover according to one of the embodiments of the invention.

Referring to FIG. 1-FIG. 3, an electrode post for a battery cover according to an embodiment of the present invention, comprises an upper substrate 10, an extension board 13 and a lower substrate 14. An upper connection surface 11 is arranged on one side of the upper substrate 10 and is configured for contacting with an external component to realize electrical connection therewith. The extension board 13 is arranged on the other side of the upper substrate 10. One side of the lower substrate 14 is arranged at a tail end of the extension board 13. A lower connection surface 15 is arranged on the other side of the lower substrate 14 and is configured for contacting with an internal component inside of a battery to realize electrical connection therewith. A groove 16 is formed in a side wall of the extension board 13 and used for receiving a sealing element and/or a fastener. Nano-pores are formed in surfaces of at least side walls of the upper substrate 10, the extension board 13 and the lower substrate 14 by nano-chemical treatment. In this embodiment, when the electrode post is mounted on the battery cover, the sealing element received in the groove 16 can be tightly clamped in the battery cover by means of a fastener, and the nano-pores increase the adhesive force at the interface and effectively increase the connection strength between the electrode post and a plastic material during nano injection molding, thus improving the structural strength of the final battery cover, effectively solving the problems of frequent falling and sealing failures of the electrode post of final battery products, improving the reliability of the final battery products and prolonging the service life of the final battery products.

Specifically, the cross-section of the upper substrate 10, the cross-section of the extension board 13 and the cross-section of the lower substrate 14 are rectangular, circular, rhombic or oval. The groove 16 is formed at least in a protrusive portion of the side wall of the extension board 13, such that the sealing element can be stably clamped in the groove 16 under the condition of a minimum influence on the current. The sealing element may be a rubber ring. The fastener may be provided with a layer of plastic cover formed by nano molding technology, and the plastic cover may be made from PPS plastic, LCP plastic, PEEK plastic, PBT plastic or PI plastic.

To further prolong the service life of the sealing element and reduce charge accumulation of the protrusive portion, a first transition surface 17 may be arranged on a sharp portion of the groove 16. The first transition surface 17 may be a slope or a round surface.

In one embodiment of the invention, the groove 16 comprises two or more discontinuous sections which are uniformly formed in the side wall of the extension board 13 to obtain good fastening performance and reduce the influence on the current. Alternatively, the groove 16 is continuously formed in the side wall of the entire extension board 13 to obtain good fastening performance.

The cross-section of the groove 16 is arc-shaped, U-shaped, square or V-shaped. The bottom of the groove 16 is in smooth transition to avoid charge accumulation to eliminate the influence on the current.

In one embodiment of the invention, a depth D of the groove 16 ranges from 0.02 mm to 10 mm, a height H of the groove 16 ranges from 0.02 mm to 10 mm, and a minimum distance W between the groove 16 and the bottom of the lower substrate 14 ranges from 0.02 mm to 5 mm.

In one embodiment, the depth D ranges from 0.5 mm to 2 mm, and the height H ranges from 0.2 mm to 10 mm.

In one embodiment of the invention, the upper substrate 10, the upper connection surface 11, the extension board 13, the lower substrate 14 and the lower connection surface 15 are formed by aluminum through integrated stamping and machining, and are mainly used for being connected to a positive electrode.

In another embodiment of the invention, the upper substrate 10, the upper connection surface 11 and the extension board 13 are made from aluminum, the lower substrate 14 and the lower connection surface 15 are made from copper, and the upper substrate 10, the upper connection surface 11, the extension board 13, the lower substrate 14 and the lower connection surface 15 are formed by integrated stamping and machining, and are mainly used for being connected to a negative electrode.

To distinguish a positive electrode from a negative electrode, a first sign 12 may be arranged on the upper connection surface 11. The first sign 12 is used for indicating the positive electrode and the negative electrode. The first sign 12 may be a convex surface or a concave surface integrally formed when the electrode post 1 is formed, or an attached element attached to the upper connection surface 11 after the electrode post is formed.

Second Embodiment

In related arts of the battery industry, electrode posts are mounted on battery covers mainly by fixed riveting and welding, and sealing rings are arranged between the battery covers and the electrode posts to realize sealing. However, all these methods have some stubborn defects such as a large number of parts, relatively complex assembly and low quality stability. Moreover, during long-term use, because the sealing elements will be aged and parts will become loose, causing sealing problems and leading to potential safety hazards. In addition, the large number of parts and the relatively complex assembly process result in a large size of a battery, which is severely opposite to use requirements.

Figure 4:
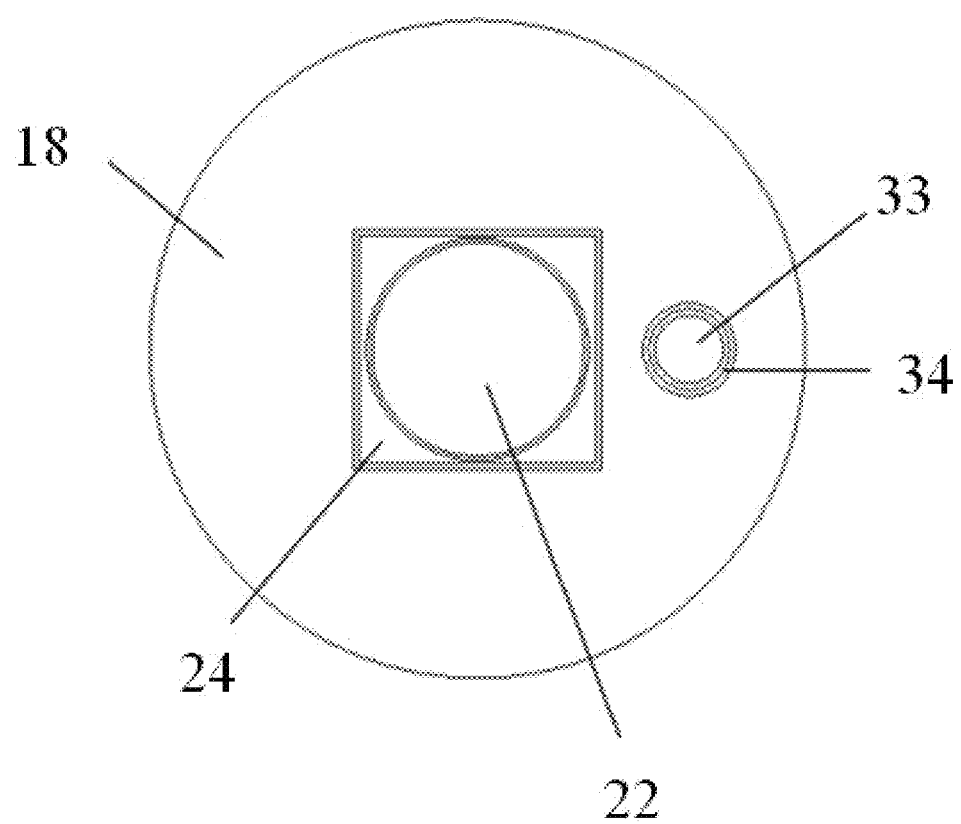
FIG. 4 is a schematic top view of a battery cover with good sealing performance according to one of the embodiments of the invention.
Figure 5:
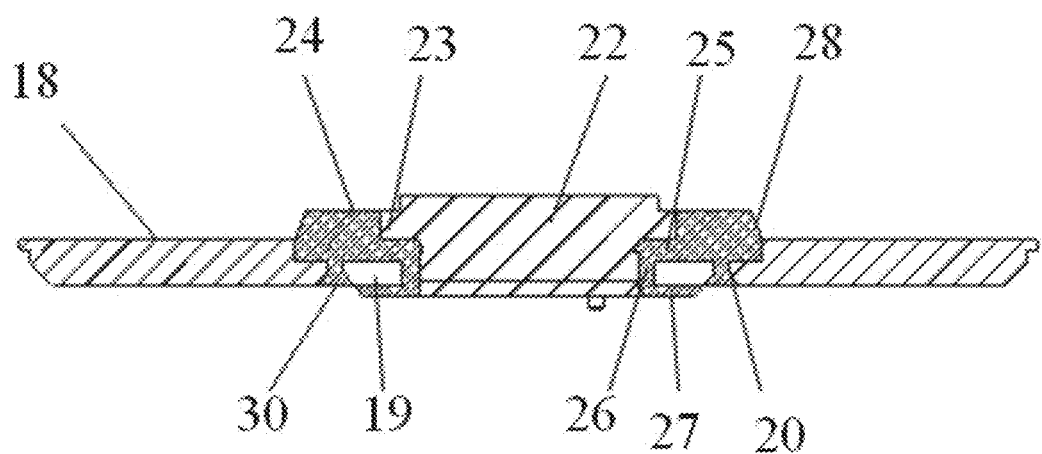
FIG. 5 is a schematic cross-sectional view along a diagonal line of a sealing element in FIG. 4.
Figure 6:
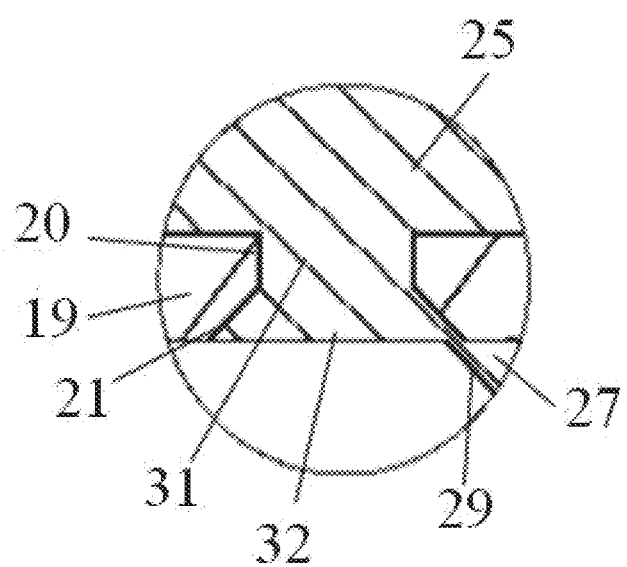
FIG. 6 is a schematic partial enlarged view of a third through-hole in FIG. 5.

To solve at least one technical problem in the related arts, referring to FIG. 4-FIG. 6, a battery cover with good sealing performance according to an embodiment of the invention, comprises a top cover plate 18, an electrode post 22 and a sealing element 24 formed by nano molding technology. A substrate 19 which is concaved inwards is arranged on the top cover plate 18. A third through-hole 20 with an undercut region is formed in the substrate 19. The sealing element 24 comprises an upper sealing layer 25, a side sealing layer 26, a lower sealing layer 27 and a dovetail-shaped column 30. The upper sealing layer 25, the side sealing layer 26 and the lower sealing layer 27 are connected sequentially and wrap around an upper surface, a side surface and one part of a lower surface of the substrate 19 respectively. The dovetail-shaped column 30 extends from the upper sealing layer 25 to fill in the third through-hole 20 with an undercut region. An edge of the dovetail-shaped column 30 partially extends out of the third through-hole 20 and is connected to the lower sealing layer 27 to form a third transition surface 29. The third transition surface 29 contracts gradually towards the electrode post 22. The electrode post 22 is arranged in the side sealing layer 26. A first flange 23 is arranged around the electrode post 22 and extends into the sealing element 24. In this embodiment, the dovetail-shaped column 30 is engaged in the third through-hole 20 with an undercut region, thus providing a long-term, stable and high-strength connection force for the sealing element 24. Moreover, the dovetail-shaped column 30 is bonded to the lower sealing layer 27 to be prevented from disengaging from the third through-hole 20, thus further improving the connection strength. The sealing element 24 wraps around three surfaces of the substrate 19 and a side surface of the electrode post 22, such that the connection strength is high, omnidirectional sealing is realized, and the sealing effect is good, durable and reliable. In addition, according to such a sealing method, the third transition surface 29 contracts, at the bottom of the top cover plate 18 (i.e., the inside of the battery), towards the electrode post 22, such that the connection strength and sealing performance are guaranteed, and little space in the battery is occupied. The first flange 23 which extends around to be inserted into the sealing element 24 enlarges the contact area between the sealing element 24 and the electrode post 22, thus further improving the sealing performance and connection strength. To sum up, the battery cover in this embodiment saves a large number of parts, occupies less space, has a low manufacturing cost, improves the sealing performance and connection strength, and is good in consistency.

Specifically, the top cover plate 18 is in the shape of a circular thin sheet, has a thickness ranging from 0.1 mm to 3.5 mm, and is made from aluminum or stainless steel. A rectangular hole is defined in the centre of the top cover plate 18. A sheet-like plate extends inwardly and slightly from a side wall of the rectangular hole to form the substrate 19. The distance between an upper surface of the substrate 19 and an upper surface of the top cover plate 18 ranges from 0.02 mm to 1.9 mm. The thickness of the substrate 19 is less than the thickness of the top cover plate 18. The electrode post 22 is cylindrical. The central axis of the electrode post 22 is coaxial with the central axis of the hole. The electrode post 22 is not in contact with the top cover plate 18. The electrode post 22 is made from aluminum or a copper-aluminum composite. Nano-pores are formed at least in surfaces, in contact with the sealing element 24, of the top cover plate 18 and the electrode post 22 by surface chemical treatment, and the surfaces, in contact with the sealing element 24, of the top cover plate 18 and the electrode post 22 at least comprise the upper surfaces, side surface and lower surfaces of the substrate 19, the inner wall of the third through-hole 20, and the side wall of the electrode post 22.

The sealing element 24 is made from PPS plastic, LCP plastic, PEEK plastic, PBT plastic or PI plastic. The upper sealing layer 25, the side sealing layer 26, the lower sealing layer 27 and the dovetail-shaped column 30 are integrally formed by nano injection molding.

In one embodiment of the invention, the dovetail-shaped column 30 and the third through-hole 20 are engaged in the form of interlocking specifically as follows: the third through-hole 20 is formed in the substrate 19, the inner diameter of the third through-hole 20 increases gradually at the bottom of the substrate 19 to form an inverted first flared opening 21, the dovetail-shaped column 30 comprises an extension column 31 and a divergent column 32, the extension column 31 extends into the third through-hole 20 from the upper sealing layer 25, the divergent column 32 diverges in the first flared opening 21, and the extension column 31 and the divergent column 32 fill in the third through-hole 20 and the first flared opening 21 respectively. It should be noted that in order to save the internal space of a battery product, the divergent column 32 only exists in the first flared opening 21 and does not extend out of the first flared opening 21, that is, the bottom surface of the divergent column 32 does not extend beyond the bottom surface of the substrate 19 where the first flared opening 21 is located.

Due to the hole in the top cover plate 18 is rectangular, the substrate 19 is also rectangular. When the substrate 19 is joined with the cylindrical electrode post 22, in order to further reduce the volume of the sealing element 24, the third through-hole 20 may be defined in four corners of the rectangular substrate 19. If the substrate 19 and the electrode post 22 are both circular when viewed from the top side, the diameter of the substrate 19 need be greater than that of the electrode post 22 at least by the diameter of the third through-holes 20. When the substrate 19 is rectangular, the third through-hole 20 can be formed in the corners of the rectangular substrate 19 as long as the four corners of the rectangular substrate 19 extend out of the electrode post 22. In this way, the volume of the sealing element 24 is greatly reduced under the condition of guaranteeing the sealing performance and connection strength.

The upper sealing layer 25 extends out of the substrate 19. A second transition surface 28 is formed by a side surface of a portion of the upper sealing layer 25 extending out of the substrate 19. An angle formed between the second transition surface 28 and the upper surface of the top cover plate 18 is 80°-179°, such that the electrode post 22 exposed to the outside can be protected.

An angle between the third transition surface 29 and the lower surface of the top cover plate 18 is 80°-179°. In a case where the angle between the third transition surface 29 and the lower surface of the top cover plate 18 is an internal angle, the third transition surface 29 may be connected to the internal structure of the battery product in the form of interlocking, thus reducing extra fixation. In a case where the angle between the third transition surface 29 and the lower surface of the top cover plate 18 is an external angle, the third transition surface 29 may be received in a groove in the battery product. In both ways, the space is saved to different extents.

In one embodiment of the invention, in order to improve the safety, an explosion-proof piece 33 may be arranged on the top cover plate 18. An explosion-proof groove 34 is formed around the explosion-proof piece 33. When the pressure in the battery product is too high due to spontaneous ignition, the internal pressure can burst the explosion-proof piece 33 open along the explosion-proof groove 34 to be released, thus avoiding an explosion of the battery product.

Third Embodiment

In related arts, when a battery is assembled, a cover is often used to cover the battery, and an electrode post is arranged on the cover to connect the inside and outside of the battery. In order to improve the structural strength of the battery, the cover is generally made from metal, and in this case, the electrode post should not be in contact with the cover, which may otherwise result in electric leakage. In order to fix the electrode post to the cover without contact, plastic is often filled between the electrode post and the cover to realize a fixing and sealing effect. However, when such a fixing method is adopted, because different materials have different coefficients of thermal expansion, cracks happen frequently to final battery products, the connection strength is low, and with the degradation of the sealing performance, the final battery products will not be used anymore finally.

Figure 7:
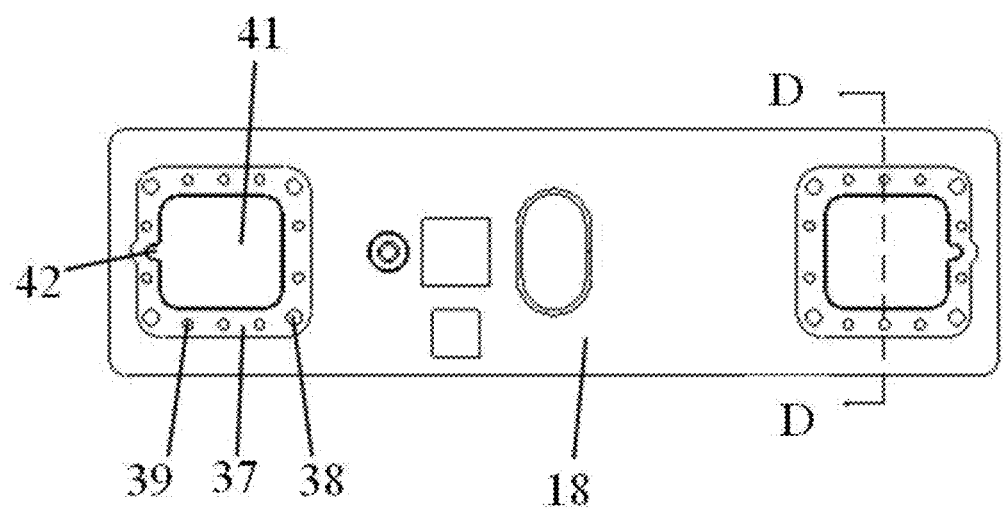
FIG. 7 is a schematic top view of a battery cover with high connection strength according to one of the embodiments of the invention.
Figure 8:
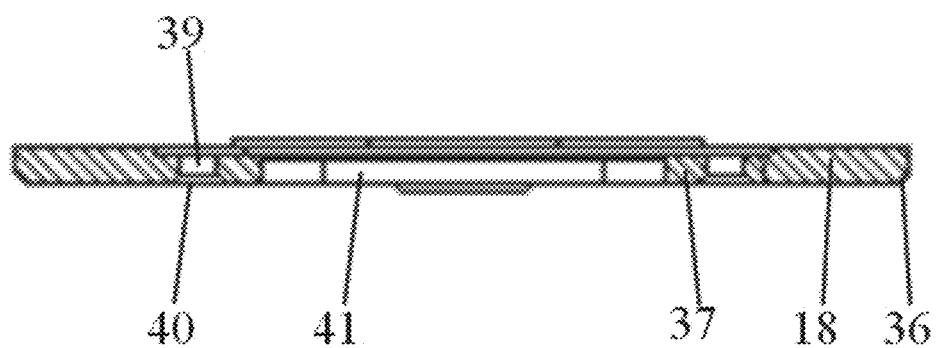
FIG. 8 is a schematic cross-sectional view along line D-D of the battery cover with high connection strength according to one of the embodiments of the invention.

To solve at least one technical problem in the related arts, referring to FIG. 7 and FIG. 8, one embodiment of the invention discloses a battery cover with high connection strength, comprising a top cover plate 18. The top cover plate 18 is provided with a connecting region 37 and a mounting hole 41. The mounting hole 41 is located in the centre of the connecting region 37 and passes through the top cover plate 18. At least one through-hole is formed in the connecting region 37, and the through-holes are uniformly distributed in the connecting region 37 and pass through the connecting region 37. In this embodiment, an electrode post pass through the mounting hole 41. When the electrode post is fixed, the electrode post is firmly fixed to the central area of the mounting hole 41 by nano injection molding. During nano injection molding, plastic penetrates through the through-holes to cover front and back sides of the connecting region 37 to be firmly fixed to the connecting region 37, thus effectively increasing the connections strength of a final battery cover assembly, effectively avoiding cracks and sealing failures of a final battery product, and improving the sealing performance and other performance of the product.

Specifically, the top cover plate 18 is in the shape of a rectangular sheet. Four corners of the top cover plate 18 are round corners. In a case where the top cover plate 18 covers one electrode of a battery, the top cover plate 18 is provided with one set of connecting region 37 and one mounting hole 41, and two top cover plates 18 are needed to assemble the battery. In a case where the top cover plate 18 covers two electrodes of the battery, the top cover plate 18 is provided with two sets of connecting regions 37 and mounting holes 41, which correspond to the positive electrode and negative electrode of the battery respectively, and only one top cover plate 18 is needed to assemble the battery. In the presence of two sets of connecting regions 37 and mounting holes 41, the two sets of connecting regions 37 and mounting holes 41 are located at opposite ends of the top cover plate 18 respectively.

In one embodiment, the top cover plate 18 only covers one electrode of a battery.

To distinguish a positive electrode from a negative electrode to prevent installation errors, a fool-proof opening 42 may be formed in the connecting region 37, and the fool-proof opening 42 is in communication with the mounting hole 41.

The connecting region 37 and the mounting hole 41 are both square. The central axis of the connecting region 37 is coaxial with the central axis of the mounting hole 41, and the diagonal of the connecting region 37 overlaps with the diagonal of the mounting hole 41. Corners of the connecting region 37 and the mounting hole 41 are all round corners. The connecting region 37 uniformly encircles the mounting hole 41 to provide a uniform adhesive force around the mounting hole 41, thus improving the stability of the entire battery cover.

To improve the integrity and reliability of the battery cover and prolong the service life of the battery cover, the connecting region 37 may be concaved in the top cover plate 18. During injection molding, plastic is uniformly filled in the connecting region 37 and is parallel to the surface of the top cover plate 18, such that the plastic can be received in the connecting region 37.

To improve the connection strength of the battery cover, nano-pores are formed in the surface of at least the connecting region 37 of the top cover plate 18 by nano-chemical treatment. The plastic can be well adhered into the nano-pores during nano injection molding.

In one embodiment of the invention, the through-holes comprise first through-holes 38 and second through-holes 39. The inner diameter of the second through-holes 39 is less than the inner diameter of the first through-holes 38. The first through-holes 38 are uniformly distributed in the connecting region 37, and each of the second through-holes 39 is located between two adjacent first through-holes 38. The first through-holes 38 and the second through-holes 39 work together so that a large and uniform connection force can be generated between the connecting region 37 and the plastic filled in the connecting region and the influence on structural strength of the connecting region 37 is reduced.

Specifically, the number of the first through-holes 38 is four, and the four first through-holes 38 are located in four corners of the connecting region 37 respectively. Four groups of second through-holes 39, the total number of which is 12, are arranged, and each group of second through-holes 39 are located between two adjacent first through-holes 38.

To improve the efficiency of the plastic passing through the through holes and improve the adhesive force of the plastic in the connecting region 37, second flared openings 40 may be formed in ends of the through-holes in the connecting region 37. The inner diameter of the second flared openings 40 decreases gradually from outside to inside until it reaches the inner diameter of the through-holes.

In one embodiment of the invention, chambers 36 are arranged on ridges at the bottom of the top cover plate 18. The chambers 36 can facilitate installation.

The top cover plate 18 and the connecting region 37 are formed by aluminum through integrated stamping or machining.

Fourth Embodiment

At present, batteries have been widely applied to the electronic field, the automative field, the aviation field, the medical field and many other fields, and the performance of the batteries has become a key factor affecting the development of all industries. Liquid batteries which are used mostly widely at present have three important performance indicators: the sealing performance of electrode posts, the connection strength of the electrode posts, and the internal resistance of the electrode posts. Existing batteries often adopt sealing rings to realize sealing; and in order to obtain high connection strength, the electrode posts are connected to battery bodies generally by fixed riveting or welding. However, the internal resistance of the electrode posts will be increased after fixed riveting and welding, the temperature of the electrode posts will rise with the increase of the internal resistance, and the temperature of the batteries will be increased accordingly. In addition, such a connection method can obtain good connection strength, a large number of parts need to be used, the assembly process is relatively complex, and the sealing performance is reduced, thus compromising the quality reliability of products.

Figure 9:
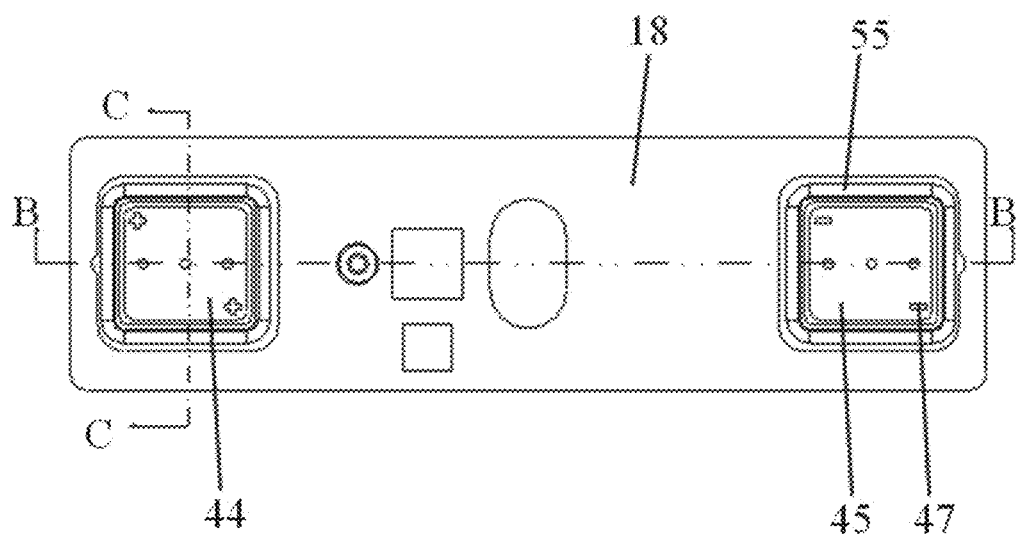
FIG. 9 is a schematic top view of a battery cover with good sealing performance according to one of the embodiments of the invention.
Figure 10:
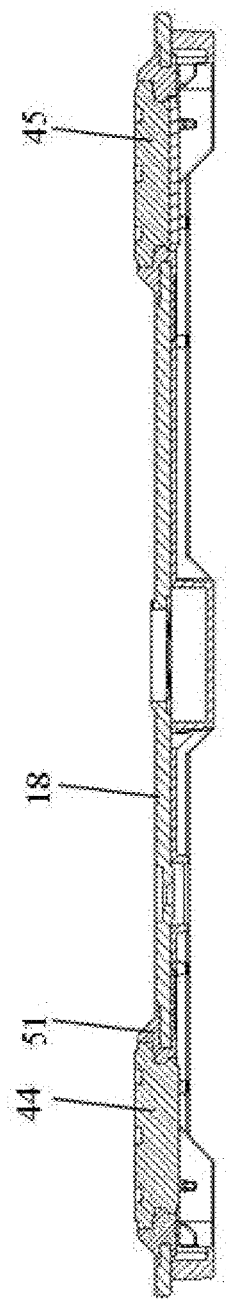
FIG. 10 is a schematic cross-sectional view along line B-B of the battery cover with good sealing performance according to one of the embodiments of the invention.
Figure 11:
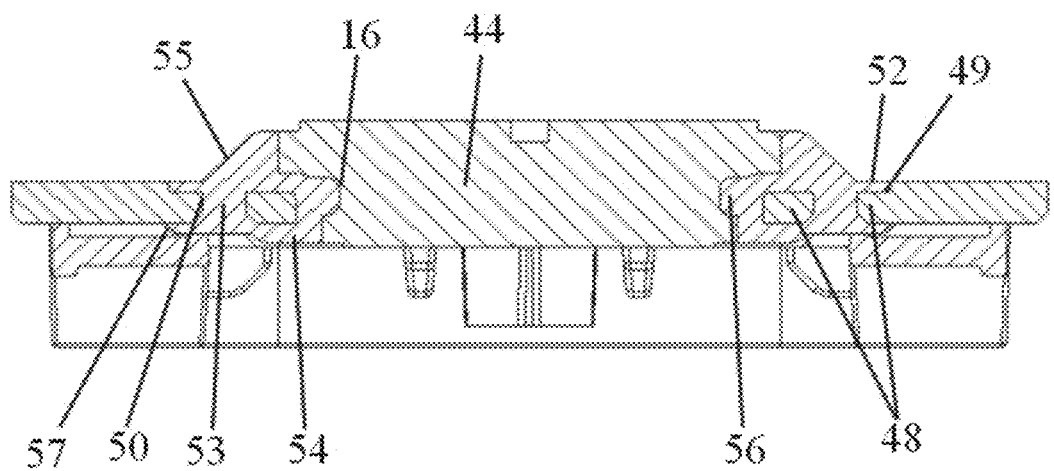
FIG. 11 is a schematic cross-sectional view along line C-C of the battery cover with good sealing performance according to one of the embodiments of the invention.

To solve at least one technical problem in the related arts, referring to FIG. 9-FIG. 11, one embodiment of the invention discloses a battery cover with good sealing performance, comprising a top cover plate 18, electrode posts and connecting members 51. Attached parts 48 are arranged on the top cover plate 18. Middle of the attached parts 48 are hollowed out. Reinforcing holes 50 are formed in the attached parts 48 and wrapped with the connecting members 51. Each connecting member 51 comprises an upper connecting layer 52, a reinforcing rod 53 and a lower connecting layer 54, wherein the upper connecting layer 5 and the lower connecting layer 54 are located on front and back side of the corresponding attached parts 48 respectively, and the reinforcing rod 53 penetrates through the corresponding reinforcing hole 50 and connects the upper connecting layer 52 and the lower connecting layer 54. A second flange 56 is arranged on an inner wall of each connecting member 51. The electrode posts are located in the hollowed-out portions of the attached parts 48. Grooves 16 are formed in side walls of the electrode posts. The connecting members 51 wrap around the side walls of the electrode posts, and the second flanges 56 are located in the grooves 16. In this embodiment, the connecting members 51 wrap around the front and back sides of the attached parts 48, and the upper connecting layer 52 and the lower connecting layer 54 of each connecting member 51 are connected by means of the reinforcing rod 53, such that the connection strength between the connecting members 51 and the top cover plate 18 can be increased, and cracks are avoided in use. The connecting members 51 also wraps around the side walls of the electrode posts and the second flanges 56 of the connecting members 51 extends into the grooves 16, such that the electrode posts can be fixed firmly. In addition, such a fully wrapping method fulfils a good sealing effect. The connection strength, sealing performance and large-current tolerance of the battery cover are improved with a simple structure and a low manufacturing cost, thus improving the reliability of the battery cover and prolonging the service life of the battery cover.

In one embodiment, the grooves 16 may be formed in a side wall of an extension board.

Specifically, the top cover plate 18 is a sheet-like rectangular plate and may be made from aluminum. Opposite two ends of the top cover plate 18 are symmetrically hollowed out to form two square holes. Sheet-like plates extend inwardly from inner walls of the holes to form the attached parts 48. The top cover plate 18, the holes and the attached parts 48 may be formed by integrated stamping or machining.

A plurality of reinforcing holes 50 are uniformly distributed in the attached parts 48. The reinforcing holes 50 are shaped like an inverted funnel to provide a large adhesive force.

The electrode posts comprise a positive electrode post 44 and a negative electrode post 45. The positive electrode post 44 and the negative electrode post 45 are both square columns. The positive electrode post 44 and the negative electrode post 45 are located in the two holes respectively and are not in contact with the top cover plate 18 and the attached parts 48. The positive electrode post 44 and the corresponding groove 16 are formed by aluminum through integrated stamping or machining. The negative electrode post 45 and the corresponding groove 16 are formed by aluminum or copper through integrated stamping or machining.

The grooves 16 are formed in side walls of the positive electrode post 44 and the negative electrode post 45. The groove 16 is continuously formed around the positive electrode post 44 or the negative electrode post. Alternatively, the groove 16 comprises multiple discontinuous sections which are uniformly distributed around the positive electrode post 44 or the negative electrode post 45.

To improve the adhesive force between the electrode posts and the connecting members 51, nano-pores may be formed in surfaces of the side walls of the electrode posts, surfaces of the grooves 16 and surfaces of at least the attached parts of the top cover plate 18 by chemical treatment. Nano-pores make connection between the electrode posts and the connecting members 51 more tightly, thus improving the connection strength and sealing performance.

Second signs 47 for indicating positive and negative electrodes are arranged on the positive electrode post 44 and the negative electrode post 45.

In one embodiment of the invention, the electrode posts protrude out of the top cover plate 18, which facilitates the electrode posts to electrically connect the electrical components inside and outside of a battery. However, the position and direction of the electrode posts protruding out of the top cover plate 18 may be changed due to touch in use, leading to poor contact. To avoid such a situation, fourth transition surfaces 55 may be arranged on the connecting members 51. The fourth transition surfaces 55 are slopes which extend from the upper connecting layers 52 to the tops of the side walls of the electrode posts 20. On one hand, the fourth transition surfaces 55 can upward release an external force or transfer the external force to the root; and on the other hand, such a wrapping around the electrode post from bottom to top can stabilize and seal the electrode posts.

In one embodiment, an angle between the fourth transition surfaces 55 and the upper connecting layers 52 is 80°-179°.

Similarly, slopes 57 are arranged on edges of the lower connecting layers 54. The angle between the slopes 57 and the bottom surface of the top cover plate 18 is 80°-179°. The slope 57 can protect the internal structure of a battery.

To improve the surface integrity and smoothness of the top cover plate 18, receiving portions 49 may be formed in surfaces of the attached parts 48. The receiving portions 49 are lower than an upper surface of the top cover plate 18. The upper connecting layers 52 are received in the receiving portions 49, and upper surfaces of the upper connecting layers 52 are not higher than the upper surface of the top cover plate 18. In this way, a lateral external force on the surface of the top cover plate 18 will not be applied to the upper connecting layers 52 and will be smoothly transferred to the fourth transition surfaces 55 and released by the fourth transition surfaces 55, thus guaranteeing the structural integrity of the connecting members 51.

In one embodiment, the upper surfaces of the upper connecting layers 52 are coplanar to the upper surface of the top cover plate 18.

In one embodiment of the invention, the thickness of the upper connecting layers 52 ranges from 0.1 mm to 3.8 mm.

The connecting member 51, the upper connecting layer 52, the reinforcing rod 53, the lower connecting member 54, the fourth transition surface 55 and the second flange 56 are integrally formed by PPS plastic through nano injection molding.

It should be noted that the connecting member in the fourth embodiment is equivalent to the sealing element or fastener in the first embodiment.

Those skilled in the art can implement or use the invention with reference to the above description of the embodiments disclosed. Various amendments to these embodiments will be obvious for those skilled in the art, and the general principle defined in the specification can be implemented in other embodiments without departing from the spirit or scope of the invention. Therefore, the invention should not be limited to the embodiments illustrated in the specification and has the broadest scope complying with the principle and novelty of disclosed in the specification.

What is claimed is:

1. A battery cover, comprising a top cover plate, an electrode post and a connecting member, wherein an attached part is arranged on the top cover plate, a middle portion of the attached part is hollowed out to form a hollowed-out portion, a reinforcing hole is formed in the attached part, the attached part is wrapped with a connecting member, the connecting member comprises an upper connecting layer, a reinforcing rod and a lower connecting layer, the upper connecting layer and the lower connecting layer are located on front and back sides of the attached part respectively, the reinforcing rod penetrates through the reinforcing hole and connects the upper connecting layer and the lower connecting layer, a flange is arranged on an inner wall of the connecting member, the electrode post is located in the hollowed-out portion of the attached part, a groove is formed in a side wall of the electrode post, the connecting member wraps around the side wall of the electrode post, and the flange is located in the groove;

a receiving portion is formed in a surface of the attached part, the receiving portion is lower than an upper surface of the top cover plate, the upper connecting layer of the connecting member is received in the receiving portion, and an upper surface of the upper connecting layer is not higher than the upper surface of the top cover plate; and the upper connecting layer has an outer circumferential wall fitted within an inner circumferential wall of the receiving portion.

2. The battery cover according to claim 1, wherein the connecting member, the upper connecting layer, the reinforcing rod, the lower connecting layer, the transition surface and the flange are integrally formed by PPS plastic through nano injection molding.

3. The battery cover according to claim 1, wherein a plurality of said reinforcing holes are uniformly distributed in the attached part, and the reinforcing holes have inverted funnel shapes.

4. The battery cover according to claim 1, wherein the groove is continuously formed around the electrode post; or the groove comprises multiple discontinuous sections which are uniformly distributed around the electrode post.

5. The battery cover according to claim 4, wherein nanopores are formed in a surface of the side wall of the electrode post, a surface of the groove and a surface of at least the attached part of the top cover plate.

6. The battery cover according to claim 1, wherein a slope is formed on an edge of the lower connecting layer.

7. The battery cover according to claim 6, wherein an angle formed between the slope and a bottom surface of the top cover plate is 80°-179°.

8. The battery cover according to claim 1, wherein a peripheral portion of the reinforcing hole is sandwiched between the upper connecting layer and the lower connecting layer.

9. The battery cover according to claim 1, wherein the upper surface of the upper connecting layer is coplanar with the upper surface of the top cover plate.

10. The battery cover according to claim 1, wherein the reinforcing rod and the slope is partly overlapped in a direction parallel to an axial direction of the electrode post.

* * * * *